United States Patent
Kassel et al.

(10) Patent No.: US 10,141,976 B2
(45) Date of Patent: Nov. 27, 2018

(54) CROSSTALK MITIGATION

(71) Applicant: Lantiq Beteiligungs-GmbH & Co. KG, Neubiberg (DE)

(72) Inventors: Pidder Kassel, Oberhaching (DE); Roland Zukunft, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 95 days.

(21) Appl. No.: 14/629,506

(22) Filed: Feb. 24, 2015

(65) Prior Publication Data
US 2016/0248475 A1 Aug. 25, 2016

(51) Int. Cl.
H04B 3/32 (2006.01)
H04M 3/34 (2006.01)
H04M 11/06 (2006.01)
H04B 3/487 (2015.01)

(52) U.S. Cl.
CPC .............. *H04B 3/32* (2013.01); *H04B 3/487* (2015.01); *H04M 3/34* (2013.01); *H04M 11/062* (2013.01)

(58) Field of Classification Search
CPC ....... H04B 3/32; H04B 3/487; H04M 11/062; H04M 3/34
See application file for complete search history.

(56) References Cited

U.S. PATENT DOCUMENTS

| | | | | |
|---|---|---|---|---|
| 8,320,435 B2* | 11/2012 | Zukunft | ............... | H04L 12/10 375/222 |
| 8,761,284 B2* | 6/2014 | Zukunft | ............... | H04L 12/10 375/222 |
| 9,819,430 B2* | 11/2017 | Zukunft | ............... | H04B 3/32 |
| 2006/0029148 A1* | 2/2006 | Tsatsanis | ............... | H04K 1/10 375/267 |
| 2007/0092260 A1* | 4/2007 | Bontu | ............... | H04J 3/0608 398/152 |
| 2009/0116374 A1* | 5/2009 | Henriksson | ......... | H04L 27/2656 370/203 |
| 2009/0271550 A1* | 10/2009 | Clausen | ............... | H04L 25/085 710/269 |
| 2009/0310502 A1* | 12/2009 | Nuzman | ............... | H04B 3/32 370/252 |
| 2010/0046738 A1* | 2/2010 | Schelstraete | ............ | H04B 3/32 379/406.01 |
| 2010/0195817 A1* | 8/2010 | Cendrillon | ............... | H04B 3/32 379/406.06 |
| 2010/0232486 A1* | 9/2010 | Starr | ............... | H04B 3/487 375/222 |

(Continued)

FOREIGN PATENT DOCUMENTS

| | | |
|---|---|---|
| EP | 2876817 A1 | 5/2015 |
| WO | 2010019486 A2 | 2/2010 |
| WO | 2014032260 A1 | 3/2014 |

OTHER PUBLICATIONS

European Search Report dated Jun. 29, 2016 for European Application No. 16154266.7.

*Primary Examiner* — Lisa Hashem
(74) *Attorney, Agent, or Firm* — Eschweiler & Potashnik, LLC (57) ABSTRACT

Methods and devices are provided for estimating crosstalk from a legacy line to a vectored line.

15 Claims, 6 Drawing Sheets

(56) References Cited

U.S. PATENT DOCUMENTS

| | | | | |
|---|---|---|---|---|
| 2010/0260282 A1* | 10/2010 | Liu | H04M 3/2245 | 375/285 |
| 2011/0058468 A1* | 3/2011 | Singh | H04M 3/304 | 370/201 |
| 2011/0075834 A1* | 3/2011 | Ashikhmin | H04B 3/32 | 379/417 |
| 2011/0110409 A1* | 5/2011 | Sands | H04B 3/487 | 375/222 |
| 2012/0183026 A1* | 7/2012 | Eriksson | H04B 3/32 | 375/222 |
| 2013/0136254 A1* | 5/2013 | Lu | H04B 3/32 | 379/406.08 |
| 2013/0251141 A1* | 9/2013 | Mermans | H04B 3/32 | 379/406.06 |
| 2014/0119419 A1* | 5/2014 | Strobel | H04B 3/32 | 375/224 |
| 2014/0140187 A1* | 5/2014 | Wang | H04M 11/062 | 370/201 |
| 2014/0233710 A1* | 8/2014 | Tu | H04B 3/487 | 379/32.04 |
| 2014/0307749 A1* | 10/2014 | Liang | H04L 27/2601 | 370/509 |
| 2014/0376604 A1* | 12/2014 | Verlinden | H04M 3/34 | 375/227 |
| 2015/0071336 A1* | 3/2015 | Kerpez | H04B 3/32 | 375/227 |
| 2015/0163350 A1* | 6/2015 | Shi | H04M 11/062 | 379/1.03 |
| 2015/0195005 A1* | 7/2015 | De Lind Van Wijngaarden | H04M 3/302 | 370/201 |
| 2015/0244418 A1* | 8/2015 | Verbin | H04B 3/32 | 370/201 |
| 2015/0295621 A1* | 10/2015 | Wang | H04B 3/32 | 370/201 |
| 2015/0341487 A1* | 11/2015 | Lu | H04B 3/32 | 379/1.03 |
| 2016/0043786 A1* | 2/2016 | Maes | H04B 3/32 | 375/260 |
| 2016/0080031 A1* | 3/2016 | Kassel | H04M 11/062 | 379/406.06 |
| 2016/0087677 A1* | 3/2016 | Strobel | H04B 3/32 | 375/285 |
| 2016/0094273 A1* | 3/2016 | Yin | H04B 3/487 | 379/406.01 |
| 2016/0105215 A1* | 4/2016 | Wang | H04B 3/32 | 370/201 |
| 2016/0105216 A1* | 4/2016 | Wang | H04M 11/062 | 379/406.01 |
| 2016/0191117 A1* | 6/2016 | Vanderhaegen | H04B 3/32 | 370/201 |
| 2016/0205264 A1* | 7/2016 | Kerpez | H04M 11/062 | 379/406.01 |
| 2016/0212036 A1* | 7/2016 | Oksman | H04B 3/32 | |
| 2016/0226556 A1* | 8/2016 | Nuzman | H04B 3/32 | |
| 2016/0248475 A1* | 8/2016 | Kassel | H04B 3/32 | |
| 2016/0248476 A1* | 8/2016 | Coomans | H04B 3/32 | |
| 2017/0019149 A1* | 1/2017 | Oksman | H04B 3/46 | |
| 2017/0054473 A1* | 2/2017 | Jochen | H04B 3/32 | |

* cited by examiner

CROSSTALK MITIGATION

TECHNICAL FIELD

The present application relates to crosstalk mitigation, sometimes also referred to as vectoring.

BACKGROUND

Far end crosstalk (FEXT) is a dominant source of disturbance in transmission systems where for example a plurality of communication lines is located close to each other. Such a situation may occur when the plurality of communication lines is provided in a so-called cable binder. To mitigate far end crosstalk, vectoring was developed. Vectoring is essentially a technique where signals transmitted via a plurality of communication lines are processed jointly, either before being transmitted or after being transmitted. In the first case, vectoring is also referred to as crosstalk precompensation, and in the latter case vectoring is also referred to as crosstalk cancellation.

For VDSL2 systems (very high bit rate digital subscriber line 2), vectoring was standardized in ITU-T recommendation G.993.5. According to this standard, training sequences are transmitted by modulating predefined sequences onto so-called synchronization symbols, also referred to as sync symbols. Sequences for different lines are selected to be orthogonal to each other. By evaluating error values (differences between received and transmitted sequences), crosstalk between lines can be estimated. Based on this estimation, crosstalk may be mitigated. For example, for crosstalk precompensation data transmitted via the line is pre-distorted by the data of every other line weighed by the respective crosstalk transfer function. A similar weighting is performed after signals are received in case of crosstalk cancellation.

However, for this mechanism, in particular the estimation of crosstalk coefficients, to be operational, devices involved (for example central office equipment and customer premises equipment) have to implement vectoring capabilities, e.g. comply with the above-mentioned standard. However, legacy devices exist which may for example be VDSL2 equipment not adapted to vectoring, i.e. not adapted to implement the mechanisms as specified in G.993.5. In some cases, communication lines (also referred to as legacy lines herein) coupled to such legacy devices are located close to other communication lines employing vectoring. Crosstalk from such legacy lines to vectored lines and vice versa cannot be cancelled or mitigated following the above-mentioned standard. Therefore, in conventional solutions the full benefit of vectoring may only be obtained in cable binders or similar arrangement of lines which all follow a common vectoring implementation, e.g. a vectoring standard. On the other hand, as legacy lines exist, it may be of interest to be able to take legacy lines into account when performing vectoring.

DETAILED DESCRIPTION

In the following, various embodiments will be described in detail referring to the attached drawings. These embodiments serve as examples only and are not to be construed as limiting. For example, while embodiments may be described as comprising a plurality of features or elements, in other embodiments some of these features or elements may be omitted and/or may be replaced by alternative features or elements. Also, further features or elements in addition to the ones explicitly shown or described may be provided.

Features from different embodiments may be combined with each other unless noted otherwise.

Any connection or coupling shown in the drawings or described herein may be a wire-based connection or coupling or a wireless connection or coupling unless noted otherwise. Furthermore, connections or couplings may be direct connections or couplings (i.e. connections or couplings without intervening elements) or indirect connections or couplings (i.e. connections or couplings with one or more additional intervening elements), as long as the basic purpose of the connection or coupling, for example to transmit a certain kind of information or to transmit a certain kind of signal, is essentially maintained.

Terminology used herein may have a meaning as defined in various xDSL (digital subscriber line) standards, for example ITU-T recommendations like ITU-T G.993.5. xDSL is a generic term used herein to refer to any kind of DSL system like ADSL (asymmetric DSL), ADSL2, VDSL (very high bit rate DSL), VDSL2 or also the upcoming G.fast. However, application of the techniques disclosed herein is not necessarily limited to xDSL. Vectoring as used herein refers to a technique defined for example in G.993.5 which reduces far end crosstalk by joint processing of signals to be sent via a plurality of communication lines or received via a plurality of communication lines. A vectored group refers to a group of communication lines to which vectoring is applied. A joining line may refer to a line which is to join the vectored group. Such a situation may for example occur when a line which previously was inactive becomes active. A legacy line refers to a line coupled to at least one communication device not adapted to vectoring, e.g. not implemented according to a vectoring standard.

Figure 1:
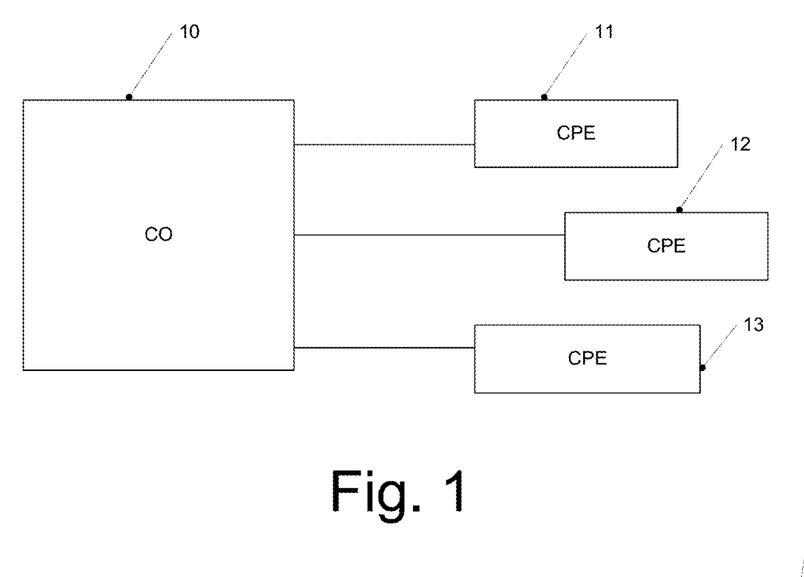
FIG. 1 is a block diagram of a system according to an embodiment.

FIG. 1 illustrates a simple diagram of a communication system according to an embodiment.

The system of FIG. 1 comprises a central office device 10. The term "central office" as used herein does not necessarily imply that the corresponding device has to be located at the office of the provider, but may relate to any equipment on a service provider's side and may include for example DSLAMs, street cabinets or the like. Central office device 10 is coupled with a plurality of customer premises devices (CPEs; customer premises equipment) 11 to 13 via a plurality of communication lines. While three customer premises devices 11 to 13 are illustrated in FIG. 1, this serves merely as an example, and any number of customer premises devices may be present.

Central office device 10 may communicate with customer premises devices 11 to 13 for example using xDSL communication. To this end, central office device 10 may for example comprise a transceiver for each of the communication lines, and each of customer premises devices 11 to 13 may also comprise a transceiver. As the general structure of such xDSL transceivers is known and at least in part defined in various xDSL standards, it will not be discussed in more detail here.

As will be discussed later in greater detail, some of the transceivers mentioned above may be adapted to employ vectoring, for example as defined in a standard like ITU-T G.993.5. For such transceivers, e.g. modified synchronization symbols (sync symbols) may be used for vector training. For example, orthogonal sequences of modified sync symbols may be transmitted via a plurality of lines to determine crosstalk, for example as defined in ITU-T G.993.5. Other transceivers may be legacy transceivers not explicitly adapted to vectoring. For example, one or more customer premises devices 11 to 13 may be legacy devices. The term "legacy" as used herein may refer to devices, systems, entities etc. not being adapted to employ standardized vectoring. For such legacy devices, in embodiments, e.g. central office device 10 may be adapted to determine crosstalk from one or more legacy lines to one or more non-legacy lines, also referred to as vectored lines herein. Such crosstalk may e.g. be determined based on an analysis of random data transmitted from legacy devices to the central office device or based on orthogonal sequences transmitted from the central office device to a legacy CPE device even if the legacy CPE device cannot return corresponding error values (as it is a legacy device not adapted to crosstalk estimation). Examples and more details will be described later.

A communication direction from central office device 10 to customer premises devices 11 to 13 will be referred to as downstream direction herein, and a communication direction from customer premises devices 11 to 13 to central office device 10 will referred to as upstream direction, as it is common in the art.

Figure 2:
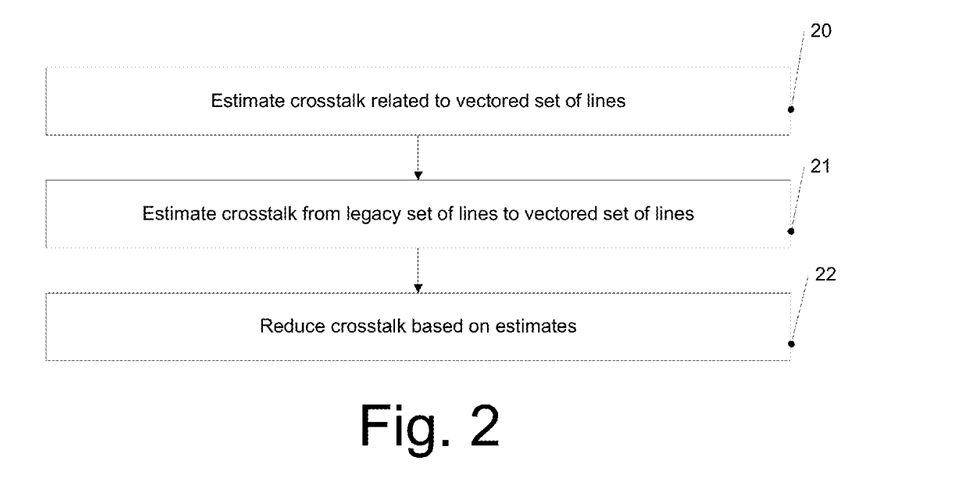
FIG. 2 is a flow chart illustrating a method according to an embodiment.

In FIG. 2, a flow chart illustrating a method according to an embodiment is shown. While the method is illustrated as a series of acts or events, the order in which these acts or events are described is not to be construed as limiting. In particular, the order in which the acts or events occur may differ from the order shown, and acts or events may also be performed simultaneously, for example by different parts of a system.

At 20, crosstalk related to a vectored set of lines of a communication system is determined based on modified synchronization symbols. This estimation may for example be performed as defined in ITU-T recommendation G.993.5. Crosstalk related to the vectored set of lines may in particular be crosstalk from lines of the vectored set to other lines of the vectored set or, in some embodiments, a non-legacy line that just became active and is about to join the vectored set.

At 21, crosstalk from a legacy set of lines to the vectored set of lines is estimated, e.g. based on modified synchronization symbols in the downstream direction or based on signals other than modified synchronization symbols in upstream direction and/or downstream direction. Examples will be described later. The legacy set of lines may for example comprise one or more lines coupled to at least one communication device not adapted to perform vectoring as defined in ITU-T G.993.5.

A set of lines, as used herein, may include one or more lines.

It should be noted that the estimation of 20 and the estimation of 21 each may be split in time or may be performed simultaneously. For example, in some scenarios at initializing a communication system only some lines (each either of the vectored set or of the legacy set) may be active, and crosstalk for these lines may be estimated at 20 and 21. Later on, further lines may become active, and their crosstalk may be estimated when they become active according to 20 or 21 of FIG. 2.

At 22, the crosstalk is reduced based on the estimates. For example vectoring, i.e. joint processing of signals to be sent or signals received, is adapted based on the estimates To illustrate further, more detailed explanations of systems according to embodiments will be explained with reference to FIGS. 3 to 5. The method of FIG. 2 or methods illustrated further below may for example be employed in the systems of FIGS. 3 to 5 or also in the system of FIG. 1, but are not limited thereto.

Figure 3:
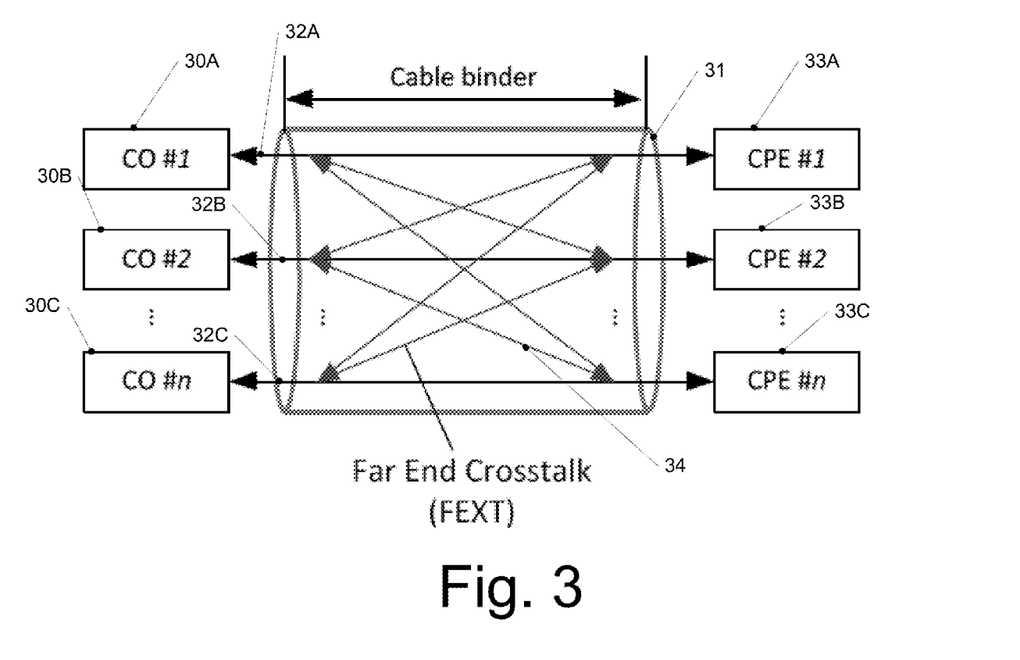
FIG. 3 is a block diagram illustrating crosstalk in a system according to an embodiment.

FIG. 3 illustrates a communication system according to a further embodiment. On a central office side, for example in a DSLAM or street cabinet, the system of FIG. 3 comprises a plurality of transceivers 30A to 30C, collectively referred to as transceivers 30. While three transceivers 30A to 30C are explicitly shown in FIG. 3, this is not to be construed as limiting, and any number of transceivers may be provided. Transceivers 30A to 30C may be xDSL transceivers. Transceivers 30 may be collocated to be able to employ vectoring or noncollocated to be able to employ vectoring over for example multiple DSLAMs.

Transceivers 30 communicate via respective communication lines 32A to 32C (collectively referred to as communication lines 32) with customer premises side transceivers 33A to 33C (collectively referred to as transceivers 33). Also here, the number of three communication lines 32 and three transceivers 33 serves merely as an example.

Arrows 34 indicate far end crosstalk (FEXT) between lines 35, which far end crosstalk may be reduced or eliminated by vectoring. Lines 32 in the example of FIG. 3 are arranged in a cable binder 31, which means that they are in comparatively close proximity to each other. This makes them prone to crosstalk like FEXT 34.

Figure 4:
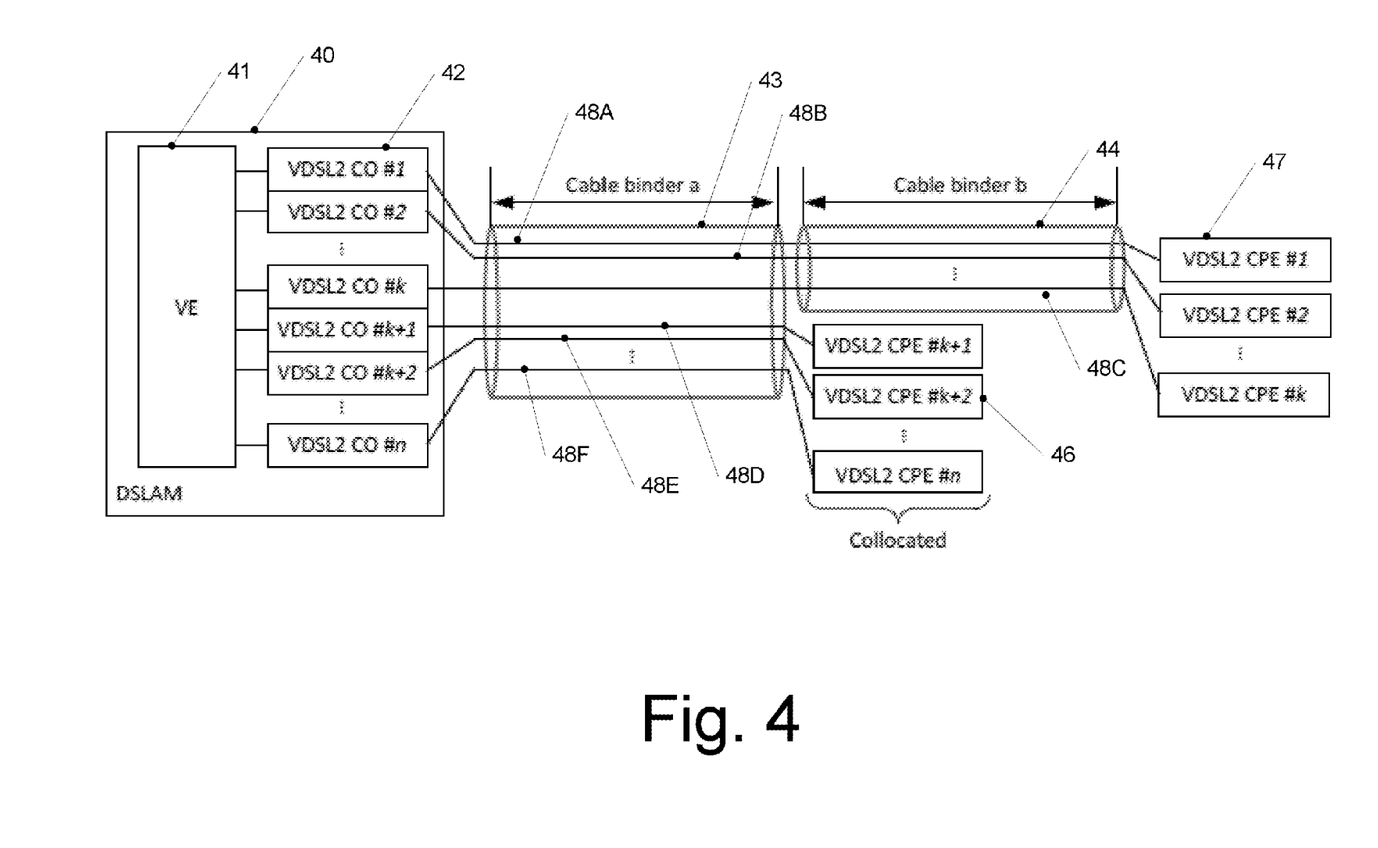
FIG. 4 is a block diagram illustrating a system according to an embodiment.

FIG. 4 illustrates a VDSL2 system according to some embodiments. While FIG. 4 and also FIG. 5 further below illustrate VDSL2 systems, this is not to be construed as limiting, as techniques disclosed herein may also be applied to other xDSL systems including G.fast. The system of FIG. 4 comprises a central office device 40, in the example shown a DSLAM. Central office device 40 comprises a plurality of VDSL2 (VDSL2 CO) transceivers 42 (for example n transceivers), which are coupled to a vectoring device 41. Vectoring device 41 may provide vectoring though joint processing of signals to be sent by transceivers 42 or of signals received by transceivers 42. Transceivers 42 communicate with customer premises side VDSL (VDSL2 CPE) transceivers 46, 47 via a plurality of communication lines 48A to 48D (collectively referred to as communication lines 48). The number of VDSL transceivers 42, 46, 47 and the number of communication lines 48 illustrated in FIG. 4 is merely an example, and other numbers may be used as well.

Lines 48A to 48F are located in a first cable binder 43. Lines 48D to 48F then terminate at VDSL2 CPE transceivers 46, which may be located comparatively close to each other. Other lines, in the example shown lines 48A to 48C, continue through a second cable binder 44 to VDSL2 CPE transceivers 47. This is merely an example scenario, and for example further communication lines may be provided which terminate it further transceivers through further cable binders or also outside cable binders.

Generally, crosstalk between lines in a common cable binder may be higher than crosstalk between lines not sharing a cable binder. Furthermore, crosstalk between lines which run in a common cable binder for a longer distance (for example between lines 48A to 48C) tend to be stronger than between lines which share a cable binder only for a shorter distance (for example between lines 48D to 48F).

Each of transceivers 42, 46 and 47 may be a VDSL2 transceiver adapted to perform vectoring (for example in compliance with ITU-T G.993.5) or may be a legacy transceiver not adapting to perform any kind of standardized vectoring. This is further illustrated in FIG. 5.

Figure 5:
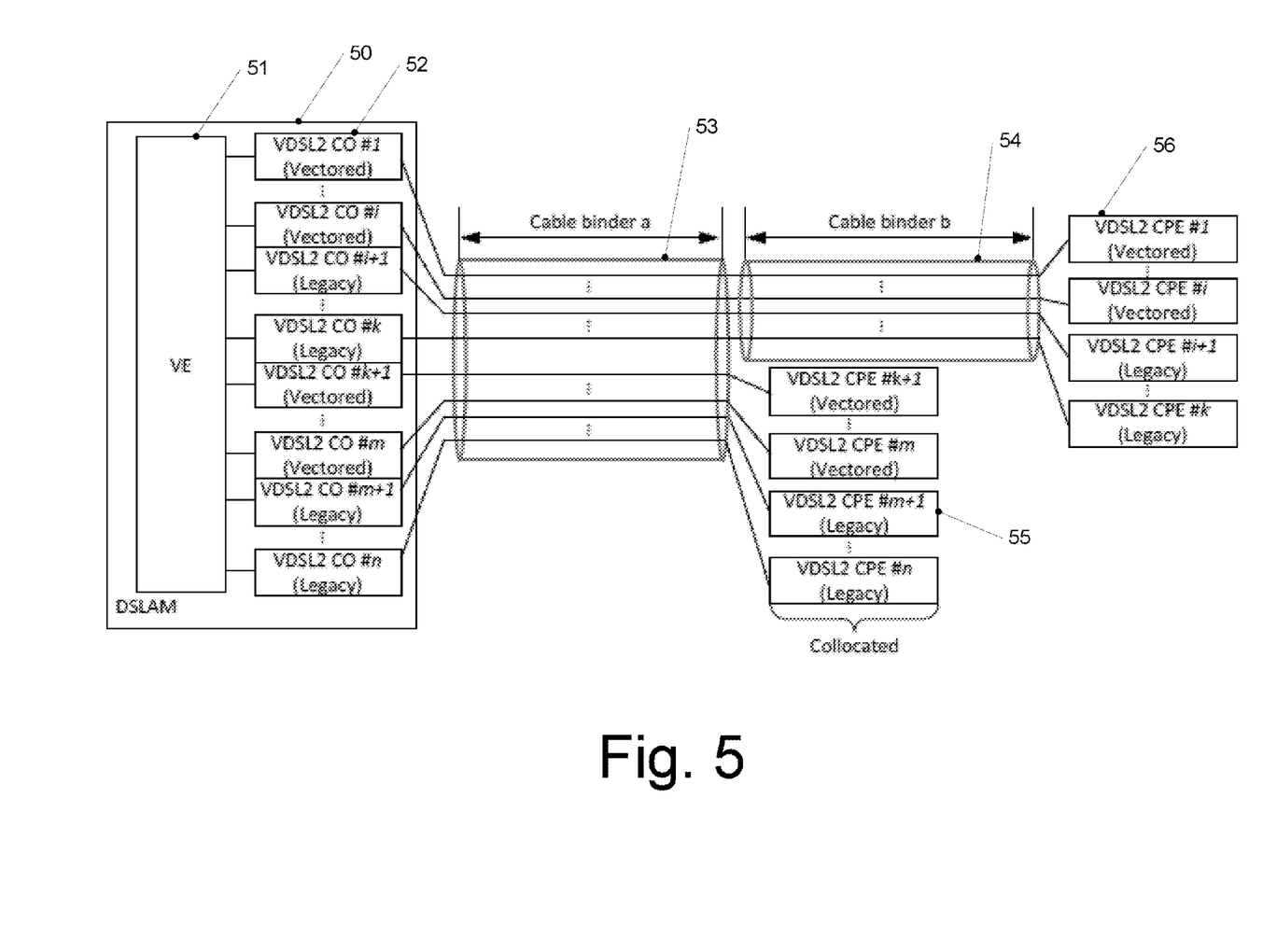
FIG. 5 is a block diagram illustrating a system according to a further embodiment.

FIG. 5 shows the communication system of FIG. 4, wherein some of the transceivers are marked (vectored), indicating that they employ vectoring, and some are indicated as (legacy), indicating that they are not adapted to perform standardized vectoring. This may in particular apply to CPE receivers 46, 47. For example, of transceivers 47 transceivers #1 to #i are "vectored", while transceivers #i+1 to #k are "legacy", and for transceivers 46 transceiver #k+1 to #m are vectored, and transceivers #m+1 to #n are legacy transceivers. The corresponding transceivers 42 in central office device 40 may operate according to the CPE transceivers, i.e. operate either as vectored or legacy transceivers. It should be noted that in some embodiments on the central office side, transceivers may be switched between a vectored mode and a legacy mode.

In the embodiments of FIGS. 3 to 5, for example a method as generally discussed with respect to FIG. 2 may be implemented. More detailed approaches to including legacy lines and transceivers in a vectored system will be discussed below.

The discussion will be made separately for downstream direction and upstream direction. Generally, in the downstream direction, a central office device like the ones illustrated in FIGS. 1-5 controls the signals to be sent to the CPE devices. Conversely, in the upstream direction, a central office device in many cases has only very limited possibilities to influence signals sent by the CPE devices. For example, in legacy VDSL2 systems the central office may only influence a transmit power of CPE devices.

First, the downstream direction will be discussed.

In the downstream direction, a central office device as mentioned above may control signals to be sent over a legacy DSL connection.

In embodiments, on legacy lines, a suitable signal, referred to as downstream (DS) vector probe signal in the following, is transmitted over one or more legacy lines in embodiments for example to estimate a downstream crosstalk transfer function from a legacy VDSL line to a vectored VDSL line. Such a DS vector probe signal may in some embodiments be transmitted before starting VDSL2 training on the legacy line. In some embodiments, such a DS vector probe signal may correspond to a sequence of sync symbols modified by an orthogonal sequence (orthogonal to sequences used on other lines as for vectored lines, with the difference that a legacy CPE device cannot return error values as it is not adapted to receive such a sequence and evaluate it). Again, while VDSL2 is used as an example herein, techniques discussed herein may also be applicable to other communication types, for example other xDSL communications.

Figure 6:
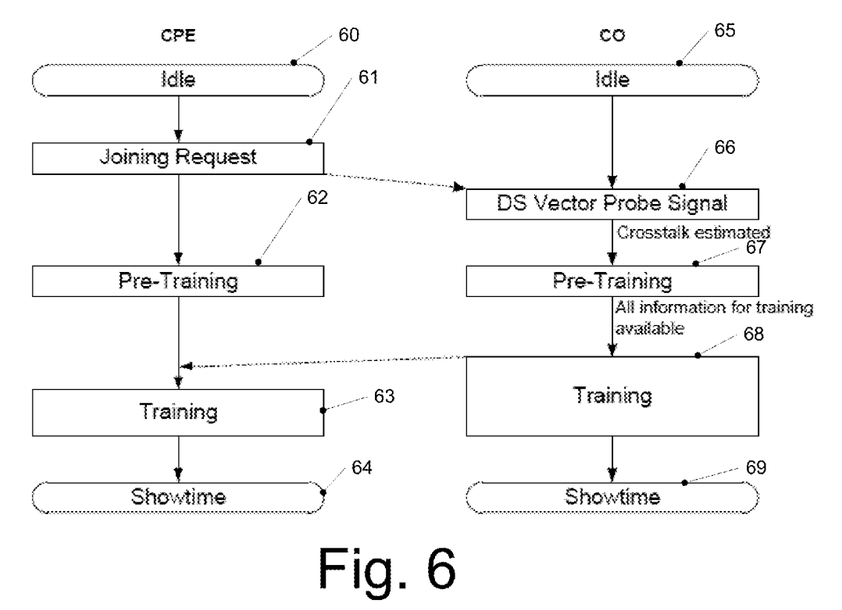
FIG. 6 is a flow chart illustrating a method according to an embodiment.

FIG. 6 shows an example embodiment of a method for a case where a legacy line is about to become active, thus potentially disturbing an already active vectored group of lines. On the left side of FIG. 6, acts or events performed on a CPE side are illustrated, and on the right side of FIG. 6 under the heading CO acts or events are performed on a CO side are illustrated. Apart from the acts or events shown, further acts or events may be performed, for example as laid down in appropriate standards like xDSL standards, for example VDSL2 as standardized in ITU-T G.993.2.

As already explained for the embodiment of FIG. 2, the order the acts or events are illustrated in FIG. 6 is not to be construed as limiting.

Prior to the joining of the new line, at 60 a CPE device (for example transceiver) is idle, and at 65 a corresponding part of a CO device (for example an associated CO transceiver like one of transceivers 42 of FIG. 5) is idle. At 61, the CPE device transmits a joining request to the CO device, indicating that the line wants to become active. At 66, the CO device transmits a DS vector probe signal to the CPE device to be able to estimate crosstalk from the joining line to lines already in the vectored group. The DS vector probe signal may in some embodiments be a signal corresponding to a crosstalk estimation sequence as defined in ITU-T G.993.5 and may comprise e.g. modified sync symbols. The DS vector probe signals may be transmitted on symbols (e.g. sync symbols) on the legacy line at the same point in time as synchronization symbols on the vectored (non legacy) lines. Therefore, in embodiments, a CO may transmit a standard vector training sequence on legacy lines without receiving error signals in return from the respective legacy CPE device. In other embodiments, random data or other signals may be used. Crosstalk is then estimated based on error values returned by vectored CPE receivers (the DS probe signal on the legacy line influences the received sequences on vectored lines).

After crosstalk has been estimated, at 62 and 67 pre-training is performed followed by training at 63 and 68 of FIG. 6. Before or in pre-training 62, 67, signals may be pre-compensated based on the estimated crosstalk from the joining line to vectored lines, such that the subsequent training of the joining line does not adversely affect the vectored lines as regards crosstalk. Training may be performed as defined in a respective standard for the joining legacy line, for example according to legacy VDSL2 (without vectoring).

After the training at 63 and 68, at 64 and 69 showtime, i.e. regular data transmission, begins.

It should be noted that while FIG. 6 illustrates the case of a joining line, it may also be applied to two or more joining lines.

Next, suitable DS vector probe signals will be discussed in more detail.

Generally, most DSL systems employ discrete multitone modulation techniques (DMT) where data is modulated onto a plurality of different so-called tones, i.e. different carrier frequencies. In embodiments, to generate the DS vector probe signals for a legacy line, a set of tones from an overall available number of tones is selected for crosstalk estimation. The selected tones are also referred to as grid tones. These grid tones, for example in sync symbols or at positions of sync symbols in vectored lines, may then e.g. be modulated by an orthogonal sequence.

Figure 8:
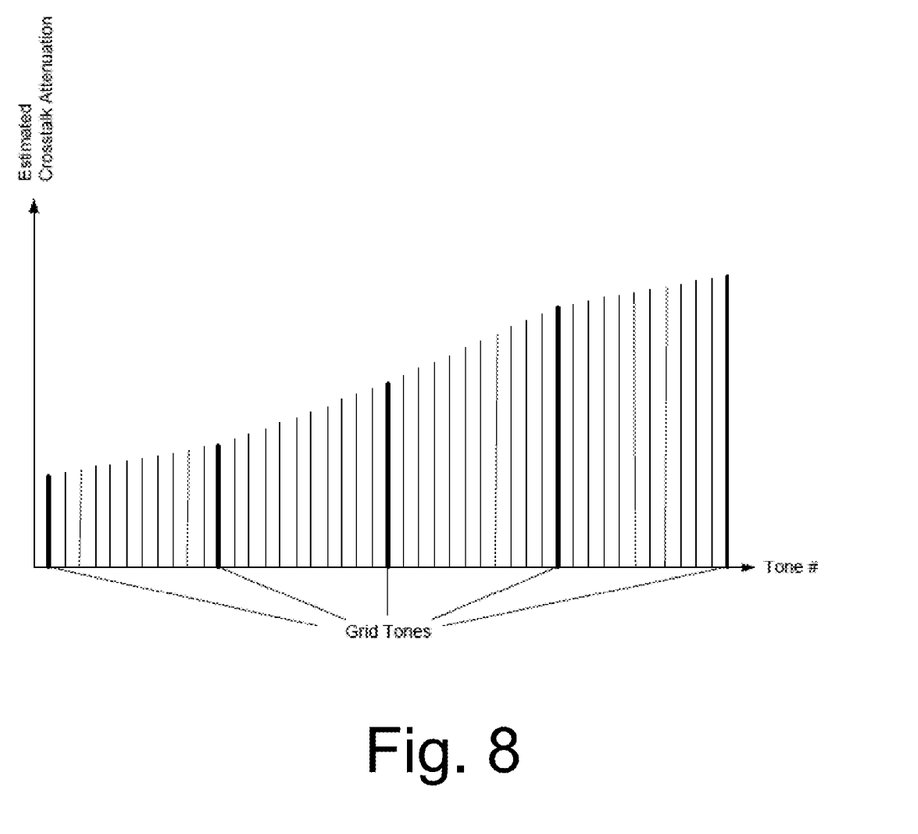
FIG. 8 is an illustrative diagram illustrating a crosstalk estimation using grid tones.

FIG. 8 illustrates an example where every $11^{th}$ tone is used as such a grid tone (in the example of FIG. 8 for example tones #1, #12, #23, #34 etc.). However, this serves only as an example and is not to be regarded as limiting. These grid tones in embodiments are modulated with a dedicated orthogonal sequence, which may be different from, in particular orthogonal to, orthogonal sequences used for crosstalk estimation on the respective vectored lines, for example may be a specific reserved sequence.

Instead of an equally spaced set of grid tones as illustrated in FIG. 8, other criteria may equally be used, for example an optimization criterium like bit loading. For example, only tones may be used onto which only a few bits (or only one bit) can be loaded, such that almost no loss of data transmission capacity occurs when using the grid tones. In yet other embodiments, instead of grid tones all tones may be used.

Crosstalk transfer functions for tones between the grid tone may then be estimated by interpolation, for example linear interpolation or non-linear interpolation, between the crosstalk estimates obtained for the grid tones.

In other embodiments, as an alternative or in addition to transmitting a dedicated DS vector probe signal, data symbols, e.g. during Showtime, may be used for crosstalk estimation. Such an approach may also be used for the upstream direction, as will be discussed later.

In some embodiments, measures may be taken to prevent the CPE from using the tone set (e.g. the grid tones discussed above) used for the DS vector probe signal for data transmission. Such measure may include:

In an embodiment, artificial noise may be added to all tones of the tone set (e.g. grid tones), for example during a channel estimation or similar part of initializing a line. Such artificial noise may be added by transmitting corresponding noise signals (e.g. random signals) on the respective tones by the CO. By adding such noise, the CPE device may come to the conclusion that no bits may be loaded on the respective tones, such that the CPE device refrains from using them.

In an embodiment, the tones of the tone set (e.g. grid tones) may be excluded from the supported set of tones as defined for example in ITU-T G.993.2 (defining VDSL2). In other embodiments, the tone set might be excluded by means of setting a CARMASK as defined for example in G.997.1 defining physical layer management for digital subscriber line transceivers accordingly. CARMASK is a configuration parameter which masks specific subcarriers (tones). In situations other than DSL communication, other corresponding masking parameters may be used.

In an embodiment, a firmware update to a legacy CPE device may be used to force the respective CPE devices not to use any tone of the selected tone set.

In some embodiments, the transmit spectrum of the legacy line may be optimized depending on the legacy CPE device's capability to follow the methods for reserving the tones explained above.

Therefore, in embodiments, an estimation of a crosstalk transfer function from a legacy VDSL line to vectored VDSL2 lines in training or in Showtime becomes possible and may be made based on an orthogonal sequence which is sent on grid tones in VDSL2 legacy symbols which are transmitted at the same point in time as the sync symbols (e.g. sync symbols, but not limited thereto) of the vectored VDSL lines.

Figure 7:
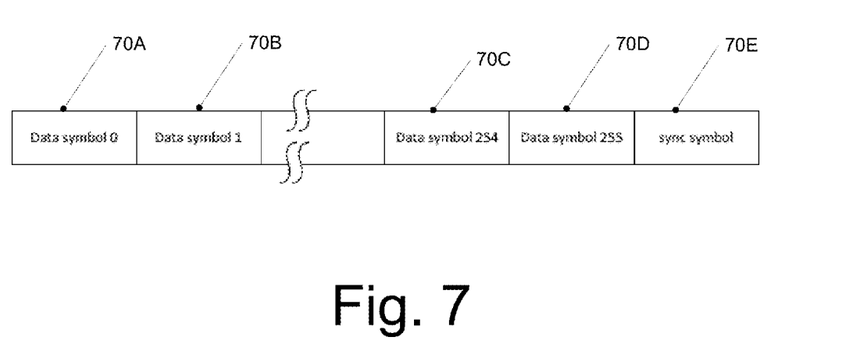
FIG. 7 is a diagram illustrating a superframe structure used in some embodiments.

In some embodiments, as mentioned above, sync symbols used also in legacy VDSL may be modified with a specific data pattern or sequence for estimating the crosstalk transfer function as DS vector probe signal. The structure of a VDSL frame is shown in FIG. 7. 256 data symbols 70A to 70D are shown followed by a sync symbol 70E. While in vectored systems following G.993.5 synchronization symbols for different lines are aligned in time, for legacy line such an alignment does not necessarily exist. A DS vector probe signal as explained above, e.g. in a VDSL2 system, may be transmitted after a first handshake (for example as defined in ITU-T G.994.1) and before the training of a joining legacy line.

The downstream synchronization symbols of the legacy lines in some embodiments nevertheless may be aligned by the CO device to synchronization symbols of vectored lines in the downstream direction. It should be noted that such an alignment may not be possible in the upstream direction, as here, as explained above, the CO device may have less influence on the transmitted data.

The estimation of the downstream crosstalk transfer function from the VDSL legacy line into vectored lines may then be performed essentially in the same way as between the VDSL vectored lines, e.g. by evaluating error signals received from CPE devices coupled to the vectored lines. For example, in VDSL2 implementing ITU-T G.993.5, CPE devices coupled vectored lines report error values, and based on these error values, the crosstalk from the legacy line to the vectored line may be estimated. The error values may be indicative of a difference between transmitted crosstalk estimation signals (e.g. orthogonal sequences) and received signals. Crosstalk transfer functions thus estimated may be re-used later for a new training, for example when a legacy line becomes inactive and active again later.

Next, the upstream direction will be discussed.

In upstream direction the CO in some embodiments has only control over the transmit power of the legacy VDSL2 signal but not over the information contained in signals being transmitted by the CPE. This means transmission in upstream cannot be limited to sync symbols in any training state (as in legacy devices there is no restriction regarding sent signals during training, whereas in vectored systems until crosstalk is estimated often only sync symbols are sent on a joining line to avoid disturbing data transmission on already vectored lines) but data which is impacting vectored VDSL2 may be transmitted in all symbols on legacy lines instead. Thus the crosstalk impact e.g. of a joining legacy VDSL2 line to vectored VDSL2 lines already in showtime in some embodiments may be limited by reducing the transmit power of the legacy VDSL2 lines until the crosstalk coefficients have been adapted and/or by increasing a margin of the vectored lines (e.g. loading less bits than possible, using higher transmit power etc.) in showtime during a crosstalk adaptation time.

In some embodiments, a significant reduction of the transmit power in upstream of a joining legacy VDSL2 line is achieved by forcing an appropriate upstream PSDMASK (as defined in VDSL2) to the appropriate legacy CPE device (e.g. legacy CPE devices of FIG. 1, 4 or 5). During operation with reduced transmit power, crosstalk from the legacy line to vectored lines may be determined, and vectoring may be adapted correspondingly. In some embodiments, in such a case two trainings of VDSL2 legacy lines may be implemented—for a first training a reduced upstream transmit power may be demanded from the VDSL2 legacy CPE by the VDSL2 legacy CO e.g. via a signal O-SIGNATURE (e.g. as defined in legacy VDSL2) to minimize the crosstalk into the vectored lines until the crosstalk coefficients are adapted whereas for the second training which is being executed after crosstalk adaptation the full upstream transmit power is applied, to train the lines for transmission with full transmit power. The reduced upstream transmit power in embodiments may be determined such that none of the vectored lines drops its link due to the joining legacy VDSL2 line under assumed worst case crosstalk conditions.

Alternatively or combined with the upstream transmit power reduction of the joining VDSL2 legacy line mentioned above, in some embodiments the VDSL2 vectored lines in showtime may be protected by reducing their upstream bit loading when a legacy VDSL2 line joins and by this means increase the upstream margin of the VDSL2 vectored lines in showtime. For this scheme one training only is required for the legacy VDSL2 line. Reduction of upstream bit loading is achieved for example by forcing an upstream SRA (Seamless Rate Adaptation) or an SOS (Save Our Showtime), which may be implemented in any conventional manner by the CO.

Because no vectoring specific upstream training signal can be applied to VDSL2 legacy lines, the estimation of the upstream crosstalk transfer functions from legacy VDSL2 to vectored VDSL2 lines in embodiments may rely on symbols containing mutual statistical uncorrelated signals transmitted on legacy VDSL2 lines in upstream direction. For example, data symbols transmitted in showtime are by nature statistically uncorrelated and so these data symbols in some embodiments are used for estimating the upstream crosstalk from legacy VDSL2 lines to vectored VDSL2 lines. In other embodiments, additionally or alternatively they may be used for estimation in the downstream direction. Furtheron the statistics of the sync symbols being used for crosstalk estimation between VDSL2 vectored lines must not be disturbed by the crosstalk of legacy VDSL2 symbols. Thus, in embodiments measures are taken such that uncorrelated signals of the legacy VDSL2 line(s) (e.g. random data) are present at sync symbol position of the VDSL2 vectored lines which carry vectoring specific data (e.g. the aforementioned orthogonal sequences) being used for crosstalk estimation between VDSL2 vectored lines. For example, in embodiments a data symbol of VDSL2 legacy lines overlaps with sync symbols of the VDSL2 vectored lines (which e.g. according to ITU-T G.993.5 are transmitted at the same time for all vectored lines). If by accident the sync symbol of a VDSL2 legacy line overlaps with the sync symbol of the VDSL2 vectored lines, this VDSL2 legacy line in embodiments is retrained with its upstream sync symbol being shifted with respect to the VDSL2 vectored sync symbols. Because VDSL2 training is controlled by the CO, the upstream sync symbol is for example shifted by shifting the start of the retrain with respect to the upstream sync symbol of the VDSL2 vectored lines compared to the previous training. While VDSL2 is used as an example above, the techniques disclosed above may also be applied to other kinds of communication, e.g. other xDSL communication techniques.

Therefore, in the upstream direction, as data symbols are used, care is taken that data symbols (e.g. random data) at least partially overlap with the symbols on the vectored line.

Essentially, in some embodiments the random data at the position of the sync symbols for purposes of crosstalk estimation may be treated as another orthogonal sequence by the CO device, for example by a vectoring entity of the CO device. While in contrast to orthogonal sequences used for crosstalk estimation in vectored systems the "sequence" formed by random data sent by a CPE device coupled to a legacy line is not a priori known to the CO device, the "sequence" as received on the legacy line may be taken as a basis for estimating crosstalk from the legacy line to the vectored line (essentially by similar algorithms as used in conventional vectoring, with the exception that instead of only predetermined orthogonal test sequences on one or more legacy lines random data or other statistically random signals transmitted by a legacy CPE device are used in embodiments). Based on error values for the vectored lines (where predetermined sequences are used and thus error values may be determined), crosstalk between the vectored lines and from the legacy lines to vectored lines may be determined.

Similar as discussed for the downstream case, crosstalk estimates obtained in this way may be re-used for a next training of a respective legacy line, and/or for example also as a starting point for crosstalk estimation for a next training.

In some embodiments, also a downstream crosstalk transfer function previously estimated, for example as described above, may be used as a starting point for estimation of crosstalk transfer in the upstream direction. This makes use of the fact that in some systems crosstalk in the upstream direction and in the downstream direction may at least to some extent behave in a similar manner.

Depending on the estimated crosstalk coefficients for the downstream and/or upstream direction, in some embodiments also parameters for Seamless Rate Adaptation (SRA) or Save Our Showtime (SOS) may be adapted.

In some embodiments, by a small firmware update of legacy CPE devices the CPE devices may also be instructed to transmit only synchronization symbols at the beginning of initialisation.

The above-described embodiments serve only as examples and are not to be construed as limiting.

What is claimed is:

1. A method, comprising:
    estimating crosstalk from at least one first communication line not operating according to a vector standard to at least one second communication line operating according to a vector standard;
    wherein estimating crosstalk comprises transmitting a probe signal from a central office device on the at least one first communication line, wherein communication via the at least one first communication line is a multitone communication; wherein transmitting the probe signal comprises transmitting a predetermined data sequence modulated on a predefined set of tones of a multitone modulation;
    adapting a vectoring based on the estimated crosstalk; and
    in order to prevent data communication on the predefined set of tones, at least one of: adding artificial noise to the tones of the predefined set of tones, excluding the predefined set of tones from a supported set of tones, excluding the tones of the predefined set of tones by a mask parameter, and excluding the predefined set of tones from communication by modifying a communication device coupled to the at least one first communication line.

2. The method of claim 1, further comprising aligning the probe signal with synchronization symbols on the at least one second communication line.

3. The method of claim 2, wherein a synchronization signal comprises the probe signal.

4. The method of claim 1, wherein estimating crosstalk further comprises estimating crosstalk from the at least one first communication line to the at least one second communication line based on uncorrelated data symbols transmitted during showtime on the at least one first communication line.

5. The method of claim 1, wherein estimation of crosstalk is performed prior to training of the at least one first communication line.

6. The method of claim 1, further comprises re-using previously estimated crosstalk.

7. A communication device, comprising:
a plurality of transceivers, each of the transceivers being configured to be coupled to a plurality of communication lines; and
a vectoring device coupled to the plurality of transceivers at least one of the transceivers being configured to support communication with a non-vector adapted further transceiver; the communication device being adapted to estimate crosstalk from a legacy line coupled to the non-vector adapted transceiver to at least one vectored line coupled to a vector adapted further transceiver based on a probe signal transmitted by the at least one transceiver on the legacy line, and further based on uncorrelated data symbols transmitted by the at least one transceiver during showtime on the legacy line;
wherein the device is configured such that communication via the legacy line and vectored line is a multitone communication; and wherein the probe signal comprises predetermined data on a subset of tones of a multitone modulation.

8. The communication device of claim 7, wherein the transceiver coupled to the legacy line is configured to align the probe signal with synchronization symbols on the at least one vectored one.

9. The communication device of claim 8, wherein the probe signal is orthogonal to crosstalk estimation signals transmitted on the at least one second communication line.

10. The communication device of claim 8, wherein a synchronization signal comprises the probe signal.

11. The communication device of claim 7, wherein the at least one transceiver is configured to perform at least one of adding artificial noise to tones of the subset of tones, exclusion of the subset of tones from a supported set of tones, exclusion of the subset of tones by a mask parameter or excluding the subset of tones from communication by modifying a communication device coupled to the at least one first communication line.

12. The communication device of claim 7, wherein the device is adapted to estimate crosstalk prior to training of the legacy line.

13. The communication device of claim 7, further being configured to re-use previously estimated crosstalk.

14. A communication device, comprising:
a plurality of transceivers, each of the transceivers being configured to be coupled to a plurality of communication lines; and
a vectoring device coupled to the plurality of transceivers; at least one of the transceivers being configured to support communication with a non-vector adapted further transceiver, the communication device being adapted to estimate crosstalk from a legacy line coupled to the non-vector adapted transceiver to at least one vectored line coupled to a vector adapted further transceiver based on uncorrelated data symbols transmitted by the at least one transceiver during showtime on the legacy line; and
wherein the device is configured such that communication via the legacy line and vectored line is a multitone communication.

15. The communication device of claim 14, further being configured to re-use previously estimated crosstalk.

* * * * *